United States Patent
Fitzgerald et al.

(10) Patent No.: US 9,448,824 B1
(45) Date of Patent: Sep. 20, 2016

(54) CAPACITY AVAILABILITY AWARE AUTO SCALING

(75) Inventors: Joseph E. Fitzgerald, Seattle, WA (US); Marvin M. Theimer, Bellevue, WA (US); Eric J. Brandwine, Haymarket, VA (US); Benjamin W. Mercier, Issaquah, WA (US); Jonathan A. Jenkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1308 days.

(21) Appl. No.: 12/979,559

(22) Filed: Dec. 28, 2010

(51) Int. Cl.
*G06F 9/455* (2006.01)
*G06F 9/52* (2006.01)

(52) U.S. Cl.
CPC ............ *G06F 9/45533* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 8,700,929 B1* | 4/2014 | Weber et al. | 713/310 |
| 2005/0120160 A1* | 6/2005 | Plouffe et al. | 711/1 |
| 2005/0256946 A1* | 11/2005 | Childress et al. | 709/223 |
| 2005/0268299 A1* | 12/2005 | Picinich et al. | 718/100 |
| 2007/0118631 A1* | 5/2007 | Devarakonda | H04L 41/06 709/223 |
| 2008/0059610 A1* | 3/2008 | Lin | G06F 9/5061 709/220 |
| 2008/0168314 A1* | 7/2008 | Narayan | G06F 11/008 714/47.2 |
| 2008/0189700 A1* | 8/2008 | Schmidt et al. | 718/1 |
| 2008/0225710 A1* | 9/2008 | Raja | G06F 9/505 370/230.1 |
| 2008/0301674 A1* | 12/2008 | Faus | G06F 9/45558 718/1 |
| 2008/0320482 A1* | 12/2008 | Dawson | G06F 9/5027 718/104 |
| 2009/0031307 A1* | 1/2009 | Chodroff et al. | 718/100 |
| 2010/0223378 A1* | 9/2010 | Wei | H04L 41/0896 709/224 |
| 2010/0228819 A1* | 9/2010 | Wei | G06F 9/505 709/203 |
| 2010/0306767 A1* | 12/2010 | Dehaan | 718/1 |
| 2010/0325191 A1* | 12/2010 | Jung | G06F 15/16 709/202 |
| 2010/0325473 A1* | 12/2010 | Agneeswaran | G06F 11/2041 714/4.1 |
| 2010/0332889 A1* | 12/2010 | Shneorson | G06Q 10/06 714/2 |
| 2011/0231696 A1* | 9/2011 | Ji | G06F 11/1438 714/3 |
| 2011/0264805 A1* | 10/2011 | Breitgand | G06F 9/45558 709/226 |
| 2011/0282982 A1* | 11/2011 | Jain | G06F 9/5094 709/223 |
| 2011/0302578 A1* | 12/2011 | Isci et al. | 718/1 |
| 2012/0054755 A1* | 3/2012 | Evans | G06Q 10/06 718/102 |
| 2012/0072571 A1* | 3/2012 | Orzell | G06F 11/008 709/224 |
| 2014/0040656 A1* | 2/2014 | Ho | G06F 9/5077 714/3 |

OTHER PUBLICATIONS

Amazon Elastic Compute Cloud (Amazon EC2) [online] [retrieved on Dec. 22, 2010] retrieved from: http://aws.amazon.com/ec2/ 11pps.

* cited by examiner

*Primary Examiner* — Eric C Wai
*Assistant Examiner* — James J Lee
(74) *Attorney, Agent, or Firm* — Lee & Hayes, PLLC

(57) ABSTRACT

Technologies are described herein for capacity availability aware auto scaling. Capacity event auto scaling rules can be defined that specify how computing resources are to be scaled during a capacity event. The capacity event auto scaling rules can be defined to allow utilization of the computing resources to increase during a capacity event. A probability that capacity will be available for providing computing resources during a capacity event can also be computed. Standard auto scaling rules utilized by an auto scaling component can then be modified based upon the computed probability. Other types of actions might also be taken based upon the computed probability, such as reserving instances of computing resources.

31 Claims, 9 Drawing Sheets

CAPACITY AVAILABILITY AWARE AUTO SCALING

BACKGROUND

Cloud services allow for the on-demand provision and utilization of computing resources, such as processing resources, storage resources, database resources, and communication resources. Cloud services also allow customers to purchase computing resources on a continual or as-needed basis. The capacity of purchased computing resources can also be scaled as needed. In this manner, the capacity of resources purchased by a cloud services customer can be scaled on-demand and the customer pays only for the utilized capacity.

Auto scaling is one mechanism for scaling cloud computing resources in response to increases or lulls in demand for the resources. Auto scaling allows cloud services customers to automatically scale cloud capacity according to conditions they define. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

Some cloud services customers using auto scaling might specify that computing resources be operated at a relatively low percentage of their maximum operating capacity. By operating computing resources at a relatively low percentage of their maximum operating capacity, demand can be rapidly reallocated to existing computing resources if an event occurs ("a capacity event") that causes a number of a customer's computing resources to fail.

As an example, a cloud services customer might operate a fleet of 300 virtual machine instances ("instances") spread equally across three data centers (100 instances each). The customer might also define auto scaling rules specifying that new instances be created when the average processor utilization of existing instances reaches 60%. In the event of a failure of one of the three data centers, the load served by instances in the failed data center will be rapidly reallocated to the two surviving data centers. Consequently, the average processor utilization of the instances executing in the surviving data centers at the time of the failure will likely climb above 60%. As a result, the auto scaling mechanism described above will cause additional instances to be generated in the surviving data centers until the average processor utilization of these instances returns to 60%.

The scenario described above illustrates several shortcomings of typical auto scaling implementations. First, operating computing resources at a relatively low percentage of their maximum operating capacity is inefficient because significant computing resources may be unused on a day-to-day basis. Second, sufficient computing resources might not be available to handle a spike in demand resulting from a capacity event. Consequently, cloud services customers may be very frustrated in the event that needed computing resources are unavailable when a capacity event occurs.

It is with respect to these and other considerations that the disclosure made herein is presented.

DETAILED DESCRIPTION

Figure 1:
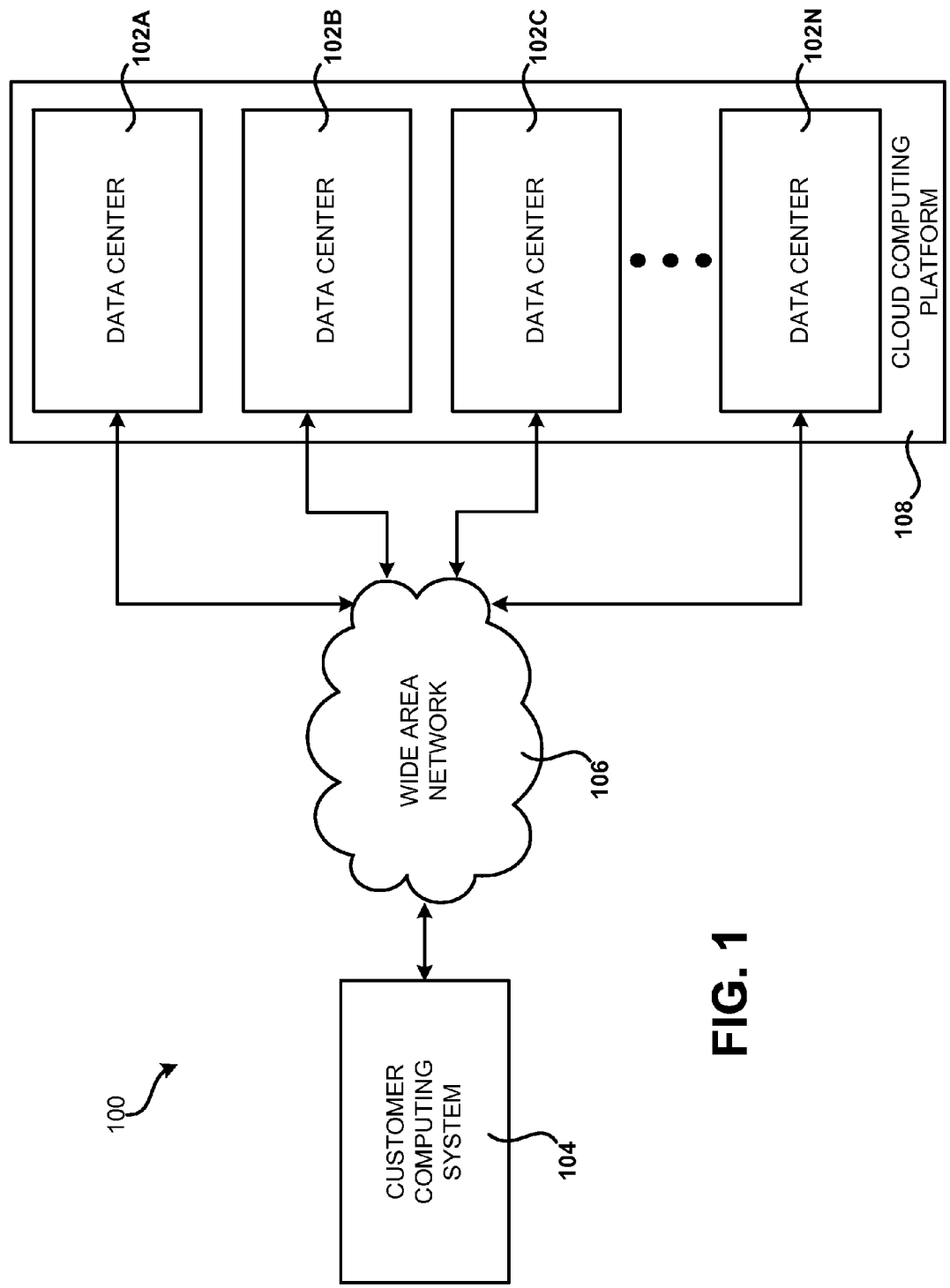
FIG. 1 is a system and network diagram showing aspects of one illustrative operating environment for the embodiments disclosed herein for capacity availability aware auto scaling.

The following detailed description is directed to technologies for capacity availability aware auto scaling. Utilizing the technologies described herein, auto scaling functionality can be coupled with an awareness of data center availability to allow an auto scaling mechanism to react to the occurrence of a capacity event. In particular, two sets of rules for auto scaling computing resources can be defined in one embodiment disclosed herein. An auto scaling component utilizes the two sets of rules to determine when computing resources should be scaled up or down. A first set of rules, referred to herein as "standard auto scaling rules," is utilized during normal data center operation. A second set of rules, referred to herein as "capacity event auto scaling rules," is utilized during a capacity event. A capacity event is an event that permanently or temporarily reduces data center capacity for providing the computing resources.

The capacity event auto scaling rules can be defined to allow utilization of the computing resources to increase during a capacity event. For instance, standard auto scaling rules may be defined that specify utilization of certain computing resources at 60%. If average utilization of the computing resources exceeds 60%, additional instances of the computing resources will be instantiated so that the utilization returns to 60%. In this example, capacity event auto scaling rules may be defined that specify utilization of computing resources at 90% during a capacity event. If a capacity event occurs, the average utilization of the computing resources will be permitted to increase to 90%, thereby preventing additional instances from being instantiated. In this manner, the rules utilized by an auto scaling component to determine when to instantiate and terminate instances of computing resources can be modified during a capacity event. The capacity event auto scaling rules might also specify the location at which new instances should be created during a capacity event.

In one implementation, the capacity event auto scaling rules include scale up rules and scale down rules for use during a capacity event. The scale up rules define conditions and actions for instantiating new instances of computing resources during a capacity event. For instance, a scale up rule may be defined indicating that three new instances of a computing resource are to be created when average utilization of existing instances reaches a specified percentage (e.g. 90%) during a capacity event. The scale down rules define conditions and actions for terminating existing instances of computing resources during a capacity event. For instance, a scale down rule may be defined indicating that one instance of a computing resource is to be terminated when average utilization of existing instances reaches a specified percentage (e.g. 30%) during a capacity event.

According to another aspect presented herein, a probability that data center capacity will be available for providing computing resources during a capacity event is computed. The standard auto scaling rules utilized by an auto scaling component may then be modified based upon the computed probability. For instance, if the computed probability indicates a high likelihood that data center capacity for providing computing resources will be available during a capacity event, the standard auto scaling rules may be modified to allow the computing resources to operate at a relatively high percentage of maximum capacity.

Other types of actions might also be taken based upon the computed probability. For instance, reserved instances may be purchased on behalf of a cloud services customer if the computed probability indicates a low likelihood that data center capacity will be available during a capacity event. Reserved instances are instances of a computing resource that are reserved for a customer in exchange for a payment. By reserving instances of computing resources in this manner, a cloud services customer can increase the likelihood, or possibly guarantee, that data center capacity will be available during a capacity event.

According to embodiments, the probability that data center capacity will be available during a capacity event may be computed based upon one or more factors. For instance, the probability may be computed based upon historical data regarding the availability of computing resources following a capacity event, the time within which new data center capacity may be made available for use, a maximum capacity and currently available capacity of data centers providing the computing resources, auto scaling rules specified by cloud services customers, historical data regarding the reaction of customers to previous capacity events, the likelihood that data center capacity will be depleted by other services during a capacity event, and the number of reserved instances purchased by data center customers. These factors might be utilized in various combinations and with various weights. Other factors might also be utilized to compute the probability that data center capacity will be available during a capacity event.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a cloud computing platform 108. As will be described in greater detail herein, the cloud computing platform 108 provides functionality for allowing customers to purchase and utilize computing resources on a continual basis, an as-needed basis, or a combination thereof.

The computing resources provided by the cloud computing platform 108 may include various types of resources, such as data processing resources, data storage resources, communication resources, and the like. Each type of computing resource may be general-purpose or may be available in a number of specific configurations. For example, data processing resources may be available as virtual machine instances ("instances") configured to provide World Wide Web ("Web") servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the cloud computing platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for capacity availability aware auto scaling will be described below with regard to FIG. 2.

The customers and other consumers of the cloud computing platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the cloud computing platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the cloud computing platform 108.

As will be described in greater detail below, the customer computing system 104 may be utilized to configure aspects of the computing resources provided by the cloud computing platform 108. In this regard, the cloud computing platform 108 might provide a Web interface through which aspects of its operation may be configured through the use of a Web browser application program executing on the customer computing system 104. Alternately, a stand-alone application program executing on the customer computing system 104 might access an application programming interface ("API") exposed by the cloud computing platform 108 for performing the configuration operations. Other mechanisms for configuring the operation of the cloud computing platform 108 might also be utilized.

According to embodiments disclosed herein, the capacity of purchased computing resources provided by the cloud computing platform 108 can be scaled in response to demand. In this regard, scaling refers to the process of instantiating (which may be referred to herein as "launching" or "creating") or terminating instances of computing resources in response to demand. In this manner, the capacity of resources purchased by a customer of the cloud computing platform 108 can be scaled on-demand.

Auto scaling is one mechanism for scaling computing resources in response to increases or lulls in demand for the resources. Auto scaling allows customers of the cloud computing platform 108 to configure the platform 108 to scale their purchased computing resources according to conditions defined by the customer. For instance, rules may be defined for scaling up capacity in a particular manner in response to the occurrence of specified conditions, such as a spike in demand. Using these rules, instances may be launched in any of the data centers 102 or in other cloud computing platforms, if available. Similarly, rules might also be defined to scale down capacity in a particular manner in response to the occurrence of other conditions, such as a lull in demand. Details regarding one auto scaling mechanism implemented by the cloud computing platform 108 will be provided below with regard to FIGS. 3-5B.

As will also be described in greater detail below, the auto scaling mechanism disclosed herein is coupled with an awareness of the availability of capacity at the data centers 102. This allows the auto scaling mechanism to react to the occurrence of a capacity event. As discussed above, a capacity event is an event that permanently or temporarily reduces the capacity of the data centers 102 for providing the computing resources. For instance, the failure of all or a portion of a data center 102 is a capacity event. Other types of capacity events might also occur that reduce or eliminate the available capacity of one or more of the data centers 102 either permanently or temporarily.

When a capacity event occurs at one of the data centers 102, requests for computing resources are typically rerouted to other data centers 102. For instance, if the data center 102A experiences a capacity event, incoming requests will be redirected to the remaining data centers 102B-102N. Consequently, demand for the computing resources received at the data centers 102B-102N will likely increase following the occurrence of a capacity event at the data center 102A.

As will be described in greater detail below, the auto scaling mechanism disclosed herein is capable of responding to the occurrence of a capacity event at one or more of the data centers 102. For instance, the auto scaling mechanism described herein may be configured to allow utilization of the computing resources to increase during a capacity event. In the example described above, the utilization of computing resources at the data centers 102B-102N may be permitted to increase during a capacity event to allow these computing resources to respond to the increased demand caused by the failure of the data center 102A. Additional details regarding this process will be provided below with regard to FIGS. 3-5B.

It should be appreciated that while the embodiments disclosed herein are discussed primarily in the context of the data centers 102, the embodiments disclosed herein might also be utilized with other types of availability zones. Availability zones are groups of computing resources that are configured to be insulated from failures in other groups of computing resources. For instance, each of the data centers 102 might be an availability zone if the data centers 102 are engineered such that a failure in one data center will not cause the failure of any other data center. Similarly, racks of server computers may be availability zones if the racks are configured such that a failure of one rack will not cause the failure of another rack. Availability zones might also include other independent groups of computing resources within a data center, data centers located within a region, regions within a cloud computing platform, and cloud computing platforms. It should be appreciated that the embodiments disclosed herein are not limited to use with data centers and may be utilized with any type of availability zone.

It should also be appreciated that while a single cloud computing platform 108 has been illustrated in FIG. 1 and described above, multiple cloud computing platforms 108 might also be implemented and configured to use the embodiments disclosed herein. In particular, the auto scaling mechanism disclosed herein might be configured to scale instances not only among the data centers 102, but also among multiple cloud computing platforms 108, if appropriate.

Figure 2:
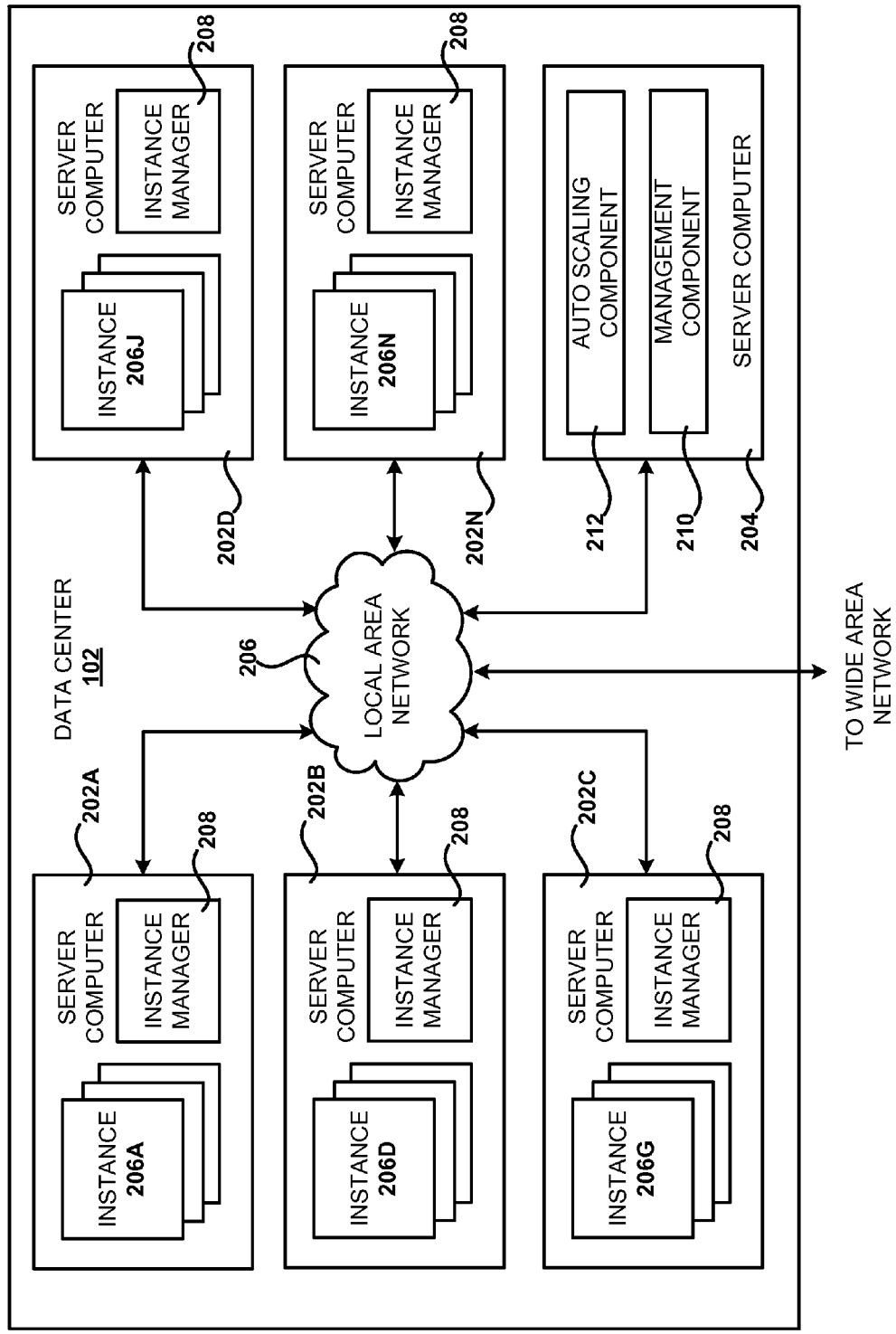
FIG. 2 is a computing system diagram that illustrates a configuration for a data center that implements the concepts and technologies disclosed herein for capacity availability aware auto scaling according to one embodiment.

FIG. 2 is a computing system diagram that illustrates one configuration for a data center 102 that implements the concepts and technologies disclosed herein for capacity availability aware auto scaling. The example data center 102 shown in FIG. 2 includes several server computers 202A-202N (which may be referred herein singularly as "a server computer 202" or in the plural as "the server computers 202") for providing on-demand computing resources. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of communications resources, and with other types of resources.

The instances 206 provided by the server computers 202 may be on-demand instances, reserved instances, spot instances, or other types of instances. On-demand instances allow customers of the cloud computing platform 108 to pay for capacity per unit of time without requiring a long-term commitment. Reserved instances are instances of a computing resource that are reserved for a customer in exchange for a payment. Spot instances allow customers to bid on unused capacity in the cloud computing platform 108 and to run those instances for as long as their bid exceeds a current spot price, which may fluctuate based upon supply and demand. The data centers 102 might also be configured to provide other types of instances 206.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the cloud computing platform 108 might utilize the customer computing system 104 to access the management component 210 to configure various aspects of the operation of cloud computing platform 108 and the instances 206 purchased by the customer. For instance, the customer may purchase on-demand, reserved, or spot instances and make changes to the configuration of these instances. The customer might also specify settings regarding how the purchased instances are to be scaled in response to demand. As will be described in greater detail below, these settings are utilized by an auto scaling component 212, also executing on the server computer 204 in one embodiment.

The auto scaling component 212 provides the functionality disclosed herein for capacity aware auto scaling. In particular, the auto scaling component 212 scales the instances 206 based upon rules defined by a customer of the cloud computing platform 108. In one embodiment, for instance, the auto scaling component 212 allows a customer to specify rules that define how computing resources are to be scaled during a capacity event. For instance, the rules can be defined to allow utilization of the computing resources to increase during a capacity event. The auto scaling component 212 might also provide functionality for modifying or adjusting auto scaling rules based on the probability that desired capacity in the data centers 102 will be available during a capacity event. Other types of actions might also be taken based upon the computed probability, such as purchasing reserved instances. Details regarding these processes will be provided below with regard to FIGS. 3-8C.

The auto scaling component 212 may execute on a single server computer 204 or in parallel across multiple server computers 202 in the cloud computing platform 108. In addition, the auto scaling component 212 may consist of a number of subcomponents executing on different server computers 202 or other computing devices in the cloud computing platform 108. The auto scaling component 212 may be implemented as software, hardware, or any combination of the two. The auto scaling component 212 may monitor available computing resources in the cloud computing platform 108 over an internal management network, for example. Additional details regarding the operation of the auto scaling component 212 will be provided below with regard to FIGS. 3-8C.

It should be appreciated that although desirable for an operator of the cloud computing platform 108, it is likely that not all of the customers of the cloud computing platform 108 will utilize the auto scaling component 212. For instance, some customers of the cloud computing platform 108 might utilize a third-party tool for scaling the instances 206. In this regard, the management component 204 might provide an appropriate mechanism, such as an API, for allowing a third-party tool to instantiate or terminate the instances 206. Other customers of the cloud computing platform 108 might manually scale the instances 206 through an appropriate interface provided by the management component 204.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate devices might also be utilized for balancing a load between each of the data centers 102A-102N and between each of the server computers 202A-202N in each data center 102. These network topologies and devices should be apparent to those skilled in the art.

Figure 3:
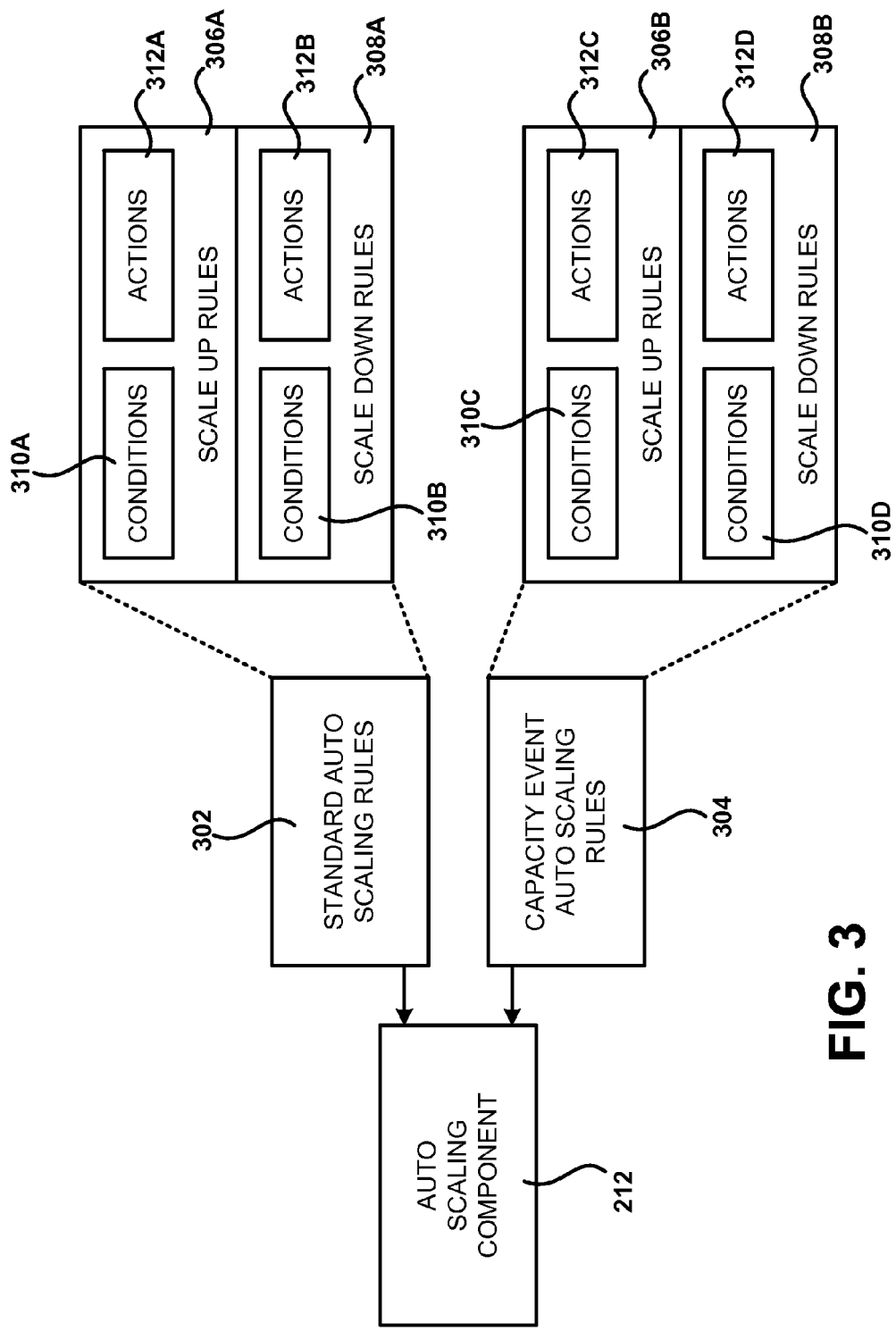
FIG. 3 is a data structure diagram illustrating aspects of standard and capacity event auto scaling rules utilized by an auto scaling component in embodiments presented herein.

FIG. 3 is a data structure diagram illustrating aspects of scaling rules utilized by an auto scaling component 212 in embodiments presented herein. In particular, FIG. 3 illustrates several types of auto scaling rules utilized by the auto scaling component 212 to scale the instances 206. As discussed briefly above, a customer of the cloud computing platform 108 can utilize functionality provided by the management component 204 to specify the auto scaling rules shown in FIG. 3. Default auto scaling rules might also be specified by the operator of the cloud computing platform 108.

In one embodiment disclosed herein, the auto scaling component 212 utilizes two sets of auto scaling rules: standard auto scaling rules 302 and capacity event auto scaling rules 304. The standard auto scaling rules 302 are auto scaling rules utilized by the auto scaling component 212 during normal operation of the data centers 102 (i.e. in the absence of a capacity event). The capacity event auto scaling rules 304 are auto scaling rules utilized by the auto scaling component 212 during a capacity event. Although two sets of auto scaling rules have been illustrated in FIG. 3 and described herein, it should be appreciated that in other embodiments the auto scaling component 212 utilizes a single set of auto scaling rules that are modified according to customer instructions during a capacity event. Other implementations might also be utilized.

As shown in FIG. 3, the standard auto scaling rules 302 include scale up rules 306A and scale down rules 308A. The scale up rules 306A define when new instances 206 should be instantiated. In particular, one or more conditions 310A may be specified indicating the conditions under which new instances 206 should be created and one or more actions 312A might be specified indicating how the instances 206 should be created. For instance, a customer might define conditions 310A and actions 312A specifying that three new instances 206 should be created when the average utilization of existing instances 206 reaches 60%. The scale up rules 306A might also define where new instances 206 should be instantiated. For example, the scale up rules 306A might specify particular availability zones in which new instances 206 should be created.

The scale down rules 308A define when instances 206 should be terminated during normal operation. For instance, one or more conditions 310B may be specified indicating the conditions under which instances 206 should be terminated and one or more actions 312B might be specified indicating how the instances 206 should be terminated. As an example, a customer might define conditions 310B and actions 312B specifying that two instances 206 should be terminated in the event that average utilization of the instances 206 falls below 10%. The scale down rules 308A might also define where unneeded instances 206 should be terminated. For instance, the scale down rules 308A might specify the particular availability zones in which unneeded instances are to be terminated. As discussed above, the scale up rules 306A and the scale down rules 308A are utilized by the auto scaling component 212 during normal operation of the data centers 102.

The capacity event auto scaling rules 304 are auto scaling rules utilized by the auto scaling component 212 during a capacity event and may include scale up rules 306B and scale down rules 308B. The scale up rules 306B define when and how new instances 206 should be instantiated during a capacity event. In particular, one or more conditions 310C may be specified indicating the conditions under which new instances 206 should be created during a capacity event. One or more actions 312C might also be specified indicating how the instances 206 should be created during the capacity event. For instance, a customer might define conditions 310C and actions 312C specifying that new instances 206 should not be created during a capacity event until the average utilization of existing instances reaches 90%. The scale down rules 308A define when instances 206 should be terminated during a capacity event and may include one or more conditions 310D and actions 312D indicating when and how instances 206 should be terminated during a capacity event.

It should be appreciated that the capacity event auto scaling rules 304 might also specify where new instances 206 should be created during a capacity event. For instance, the capacity event auto scaling rules 304 might specify the particular availability zones in which new instances should be created in the event of a failure of another availability zone. The capacity event auto scaling rules 304 might also specify where instances 206 are to be terminated during a capacity event in a similar manner. In other embodiments, the capacity event auto scaling rules 304 also specify how instances 206 created during a capacity event are to be migrated to other availability zones after a capacity event has been resolved.

According to various embodiments, a customer of the cloud computing platform 108 might operate a fleet of instances 206 across the data centers 102A-102N. In this scenario, the management component 210 might provide functionality for allowing the customer to define groups of instances 206 within the fleet. Additionally, the management component 210 might also provide functionality for defining different standard auto scaling rules 302 and capacity event auto scaling rules 302 for each group of instances 206. In this manner, the auto scaling component 212 may scale groups of instances 206 differently during a capacity event. Additional details regarding the use of the standard auto scaling rules 302 and capacity event auto scaling rules 302 by the auto scaling component 212 will be provided below with regard to FIGS. 4-5.

Figure 4:
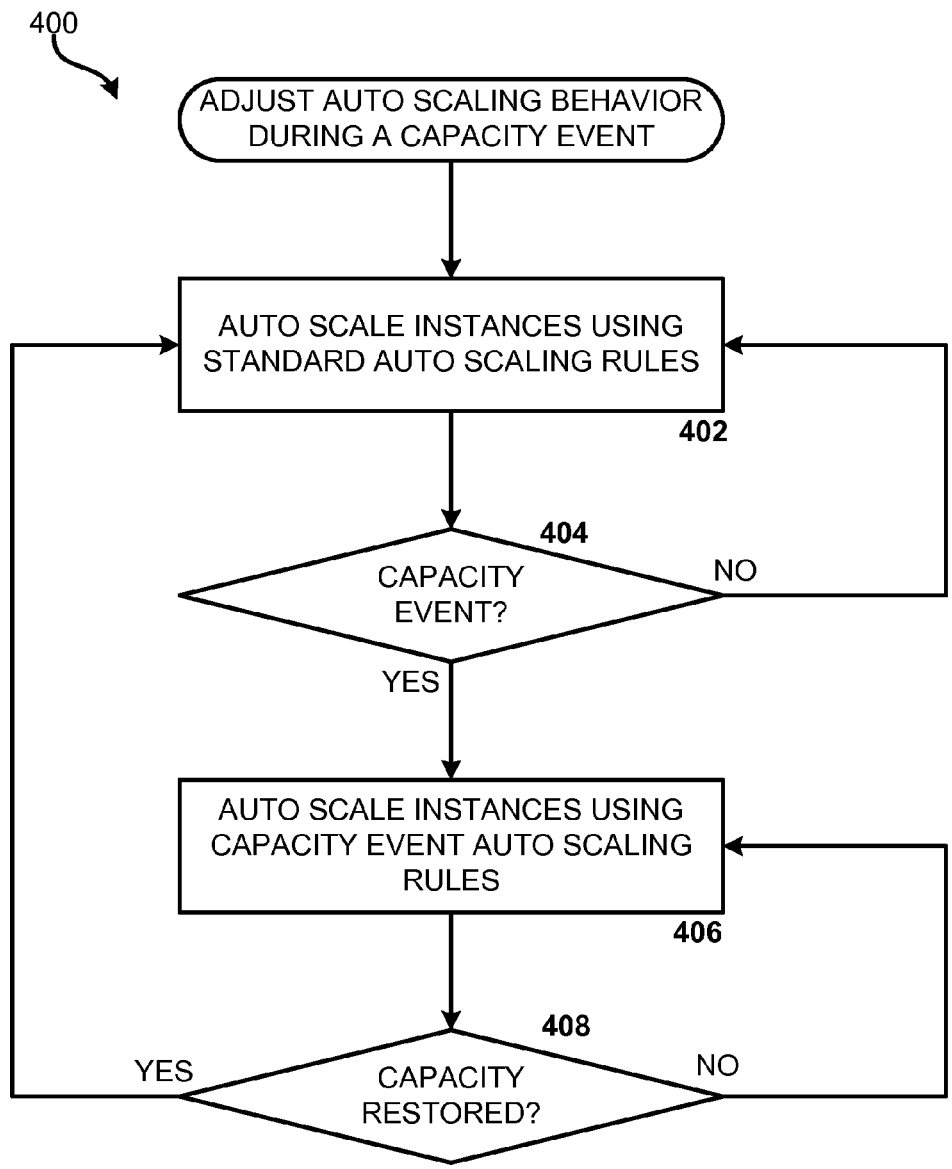
FIG. 4 is a flow diagram showing one method disclosed herein for adjusting auto scaling behavior during a capacity event.

Turning now to FIG. 4, additional details will be provided regarding one illustrative process disclosed herein for capacity availability aware auto scaling. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for adjusting auto scaling behavior during a capacity event. In one embodiment, the routine 400 is performed by the auto scaling component 212. It will be appreciated that the routine 400 may also be performed by another module or component, the management component 210, or by a combination of modules and components.

The routine 400 begins at operation 402, where the auto scaling component 212 utilizes the standard auto scaling rules 302 to scale the instances 206 during normal operation of the data centers 102. As discussed above, the auto scaling component 212 will utilize the auto scaling rules 302 to instantiate and terminate instances during normal operation of the data centers 102.

From operation 402, the routine 400 proceeds to operation 404, where the auto scaling component 210 determines whether a capacity event has occurred. For instance, the auto scaling component 210 might receive a notification from the management component 204 or another component operating within one of the data centers 102 indicating that a capacity event has occurred. If the auto scaling component 210 determines that a capacity event has not occurred, the routine 400 proceeds back to operation 402, described above. If the auto scaling component 210 determines that a capacity event has occurred, the routine 400 proceeds to operation 406.

At operation 406, the auto scaling component 212 begins utilizing the capacity event auto scaling rules 304 to scale the instances 206 during the capacity event. The routine 400 then proceeds to operation 408, where the auto scaling component 210 determines whether capacity has been restored following the capacity event. For instance, the auto scaling component 210 might receive a notification from the management component 204 or another component operating within one of the data centers 102 indicating that data center capacity has been restored to its original level. If the auto scaling component 210 determines that data center capacity has not been restored, the routine 400 proceeds back to operation 406, described above. If the auto scaling component 210 determines that capacity has been restored, the routine 400 proceeds to back to operation 402, where the auto scaling component 212 once again utilizes the standard auto scaling rules 302 to scale the instances 206.

Figure 5A:
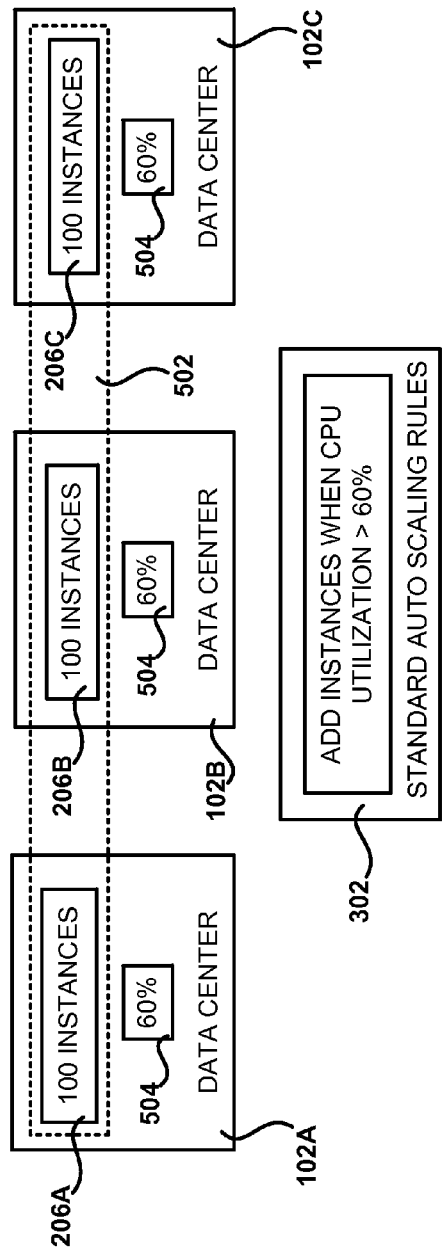
FIGS. 5A-5B are computing system diagrams showing the use of the concepts and technologies disclosed herein for adjusting auto scaling behavior during a capacity event within an illustrative data center configuration.
Figure 5B:
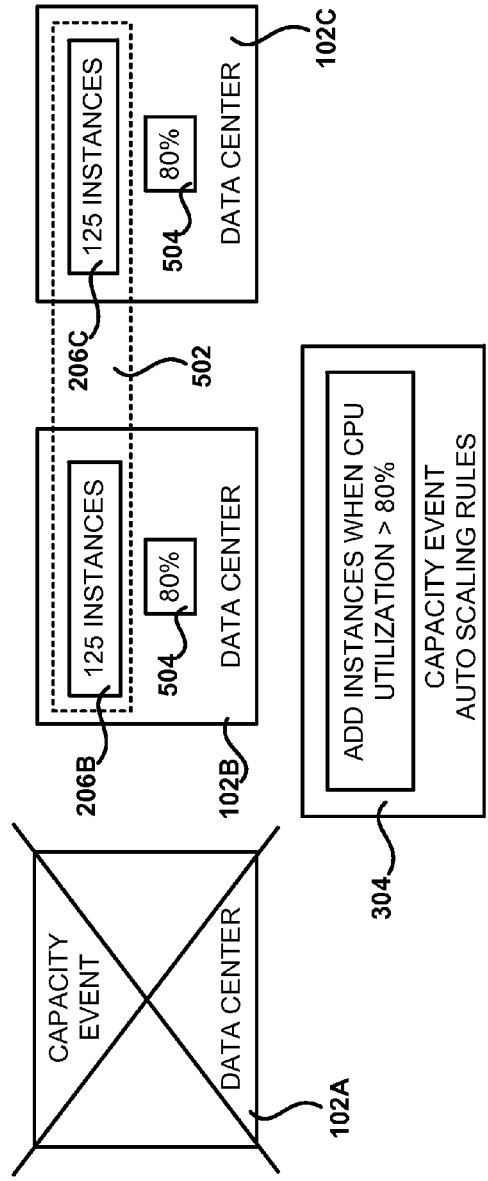

FIGS. 5A-5B are computing system diagrams showing the use of the concepts and technologies disclosed herein for adjusting auto scaling behavior during a capacity event within an illustrative data center configuration. In the example shown in FIG. 5A, a customer of the cloud computing platform 108 is operating a fleet 502 of 300 instances 206A-206C in three data centers 102A-102C (100 instances in each data center). The customer has also specified standard auto scaling rules 302 indicating that new instances should be added when the average utilization 504 of the existing instances 206A-206C exceeds 60%. Consequently, the average utilization 504 of the instances 206A-206C operating in the data centers 102A-102C under normal conditions is maintained at 60%.

In the example shown in FIGS. 5A-5B, the customer has also defined capacity event auto scaling rules 304 specifying that new instances should be instantiated during a capacity event when average utilization of the instances exceeds 80%. Consequently, if a capacity event occurs at the data center 102A, as shown in FIG. 5B, the average utilization of the instances 206B and 206C in the data centers 102B and 102C will be permitted to rise to 80%. In this manner, a lower number of new instances may be created in the data centers 102B and 102C than were operating in the data center 102A at the time of the capacity event.

In the example shown in FIG. 5B, 100 instances 206 were lost as a result of the capacity event at the data center 102A. However, only 25 new instances were created in each of the data centers 102B and 102C (50 instances total) in order to absorb the reallocation of demand from the data center 102A. It should be appreciated that the example shown in FIGS. 5A-5B is merely illustrative and that the embodiments disclosed herein contemplate other types of capacity events (e.g. capacity events occurring at multiple data centers simultaneously) and the scaling of instances 206 within the data centers 102 in different ways.

It should be appreciated that the example shown in FIG. 5B is for illustration purposes only and that the particular number of instances illustrated therein as being utilized following a capacity event will depend upon the specific application hosted by the instances. In this regard, it should be appreciated that application performance typically does not vary linearly with processor utilization. Consequently, it may be difficult to predict the number of instances needed to support a particular application at various levels of processor utilization. In practice, a customer of the cloud computing platform 108 might monitor application performance at various levels of processor utilization and modify the auto scaling rules described herein in an appropriate manner to ensure that suitable application performance will be maintained during normal operation and during a capacity event.

Figure 6:
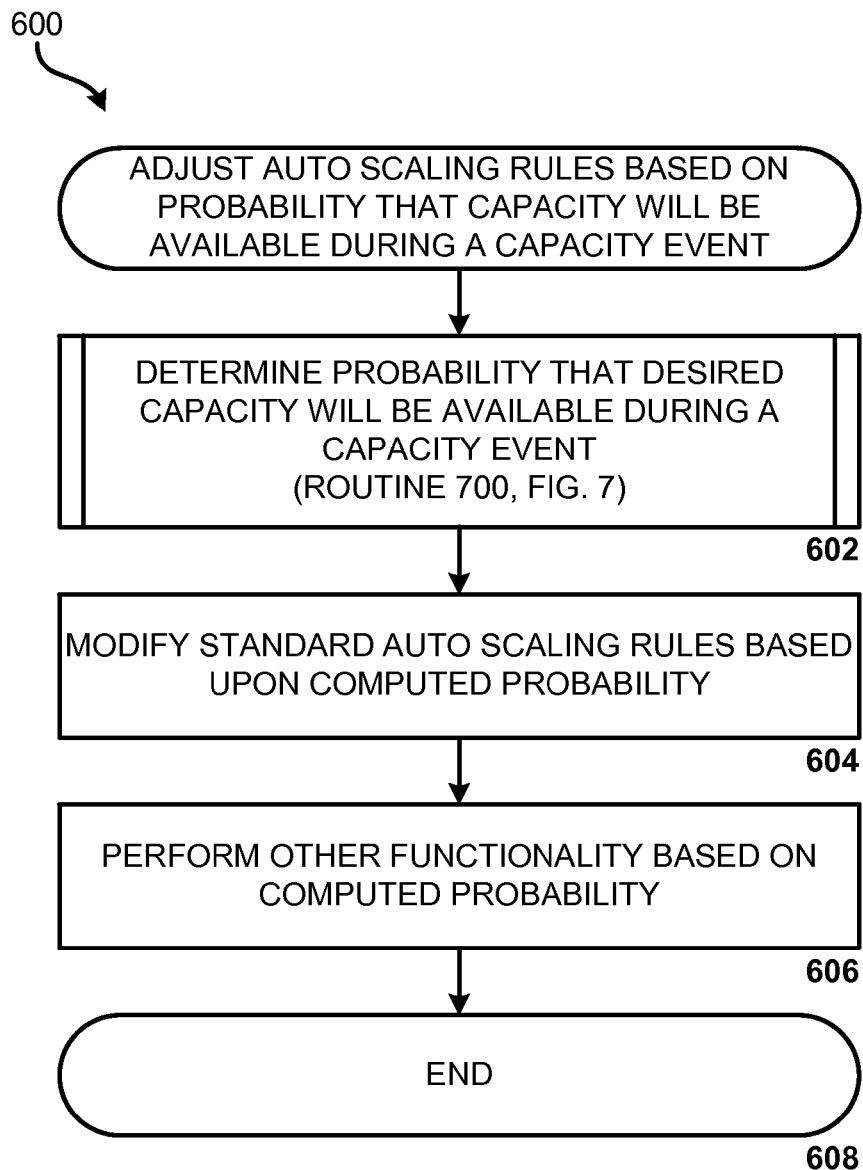
FIG. 6 is a flow diagram showing one method disclosed herein for adjusting auto scaling rules based upon a probability that data center capacity will be available at the time of a capacity event.

FIG. 6 is a flow diagram showing a routine 600 disclosed herein for adjusting the standard auto scaling rules 302 based upon a probability that data center capacity will be available at the time of a capacity event. As discussed above, operating computing resources at a relatively low percentage of their maximum operating capacity is inefficient because significant computing resources may be unused on a day-to-day basis. However, customers of the cloud computing platform 108 may specify that instances 206 be operated at a relatively low percentage of their maximum operating capacity in order to ensure that sufficient capacity is quickly available when a capacity event occurs. If a customer elects to operate the resources at a higher percentage of maximum capacity, sufficient computing resources might not be readily available to handle a spike in demand resulting from a capacity event. Consequently, cloud services customers may be very frustrated in the event that needed computing resources are unavailable when a capacity event occurs.

The concepts and technologies described below with regard to FIGS. 6-8C compute a probability that capacity will be available in the data centers 102 for providing computing resources, such as the instances 206, during a capacity event. The standard auto scaling rules 302 utilized by the auto scaling component 212 can then be modified based upon the computed probability. For instance, if the computed probability indicates a high likelihood that data center capacity for providing computing resources will be available during a capacity event, the standard auto scaling 302 rules may be modified to allow the computing resources to operate at a relatively high percentage of maximum capacity.

Other types of actions might also be taken based upon the computed probability. For instance, reserved instances may be purchased on behalf of a customer of the cloud computing platform 108 if the computed probability indicates a low likelihood that capacity will be available in the data centers 102 during a capacity event. Additional details regarding these processes will be provided below.

The routine 600 shown in FIG. 6 begins at operation 602, where the probability that desired capacity will be available in the cloud computing platform 108 for a customer during a capacity event is computed. The probability might be computed by the management component 204, the auto scaling component 212, or another component operating within the cloud computing platform 108. As will be discussed in detail below, a number of factors might be utilized to compute the probability. One illustrative routine for computing the probability that data center capacity will be available during a capacity event will be described below with regard to FIG. 7.

From operation 602, the routine 600 proceeds to operation 604, where the standard auto scaling rules 302 are modified based upon the probability computed at operation 602. For instance, if there is a high probability that capacity will be available during a capacity event, then the standard auto scaling rules 302 may be modified to allow the instances 206 to operate at a higher percentage of their maximum capacity. Alternately, if there is a low probability that capacity will be available during a capacity event, then the standard auto scaling rules 302 may be modified to require the instances 206 to operate at a lower percentage of their maximum capacity.

It should be appreciated that modification of the standard auto scaling rules 302 might be performed by a component within the cloud computing platform 108, such as the management component 210 or the auto scaling component 212. Alternately, a customer of the cloud computing platform 108 might be presented with the computed probability and permitted to manually adjust the standard auto scaling rules 302 through an appropriate user interface. The capacity event auto scaling rules 304 might also be adjusted based upon the computed probability.

From operation 604, the routine 600 proceeds to operation 606, where other actions might also be taken based upon the computed probability. For instance, reserved instances may be purchased on behalf of a cloud services customer if the computed probability indicates a low likelihood that data center capacity will be available during a capacity event. As discussed above, reserved instances are instances of a computing resource that are reserved for a customer in exchange for a payment. By reserving instances of computing resources in this manner, a cloud services customer can increase the probability, or possibly guarantee, that data center capacity will be quickly available during a capacity event. Other actions might also be taken based upon the computed probability. From operation 606, the routine 600 proceeds to operation 608, where it ends.

Figure 7:
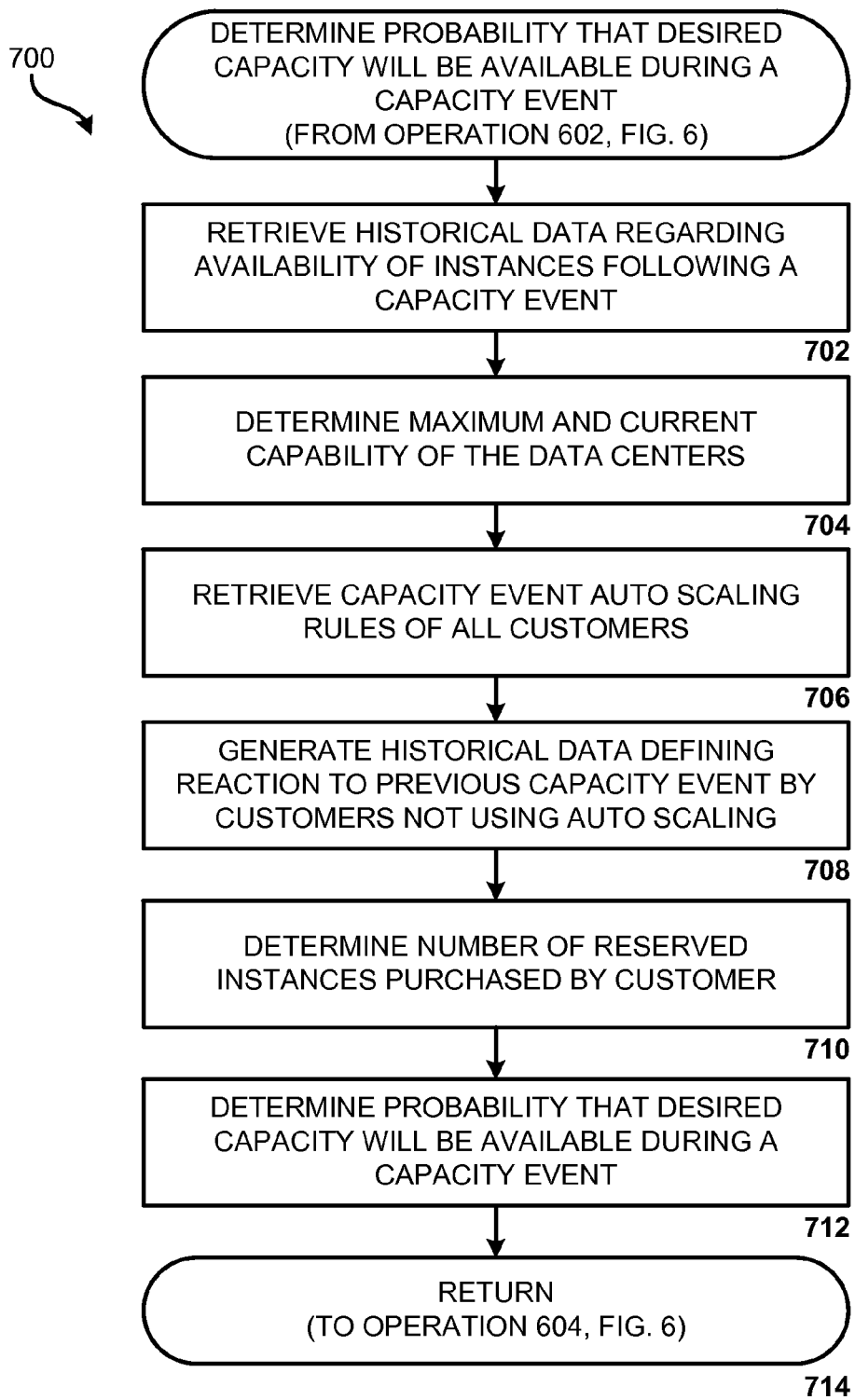
FIG. 7 is a flow diagram showing one method disclosed herein for computing the probability that desired data center capacity will be available at the time of a capacity event.

FIG. 7 is a flow diagram showing a routine 700 disclosed herein for computing the probability that desired data center capacity will be available at the time of a capacity event. As discussed briefly above with regard to operation 602 of the routine 600, the probability might be computed by the management component 204, the auto scaling component 212, or another component operating within the cloud computing platform 108. As also discussed briefly above, a number of factors might be utilized to compute the probability. Several of these factors are described below. It should be appreciated, however, that factors other than those described herein may be utilized in computing the probability. It should also be appreciated that the various factors might be weighted to emphasize or de-emphasize the relevance of each factor.

The routine 700 begins at operation 702, where historical data regarding the availability of the instances 206 following a capacity event is retrieved. The historical data regarding the timely availability of data center capacity following a capacity event may be utilized to predict the probability that data center capacity will be available following a future capacity event.

From operation 702, the routine 700 proceeds to operation 704, where the maximum capacity and current available capacity of the data centers 102 is determined. Quantifying the maximum load that can be served by the data centers 102 and the current load served by the data centers 102 can assist in predicting the likelihood that capacity will be available if one or more of the data centers 102 experiences a capacity event.

From operation 704, the routine 700 proceeds to operation 706, where the capacity event auto scaling rules 304 for the customers of the cloud computing platform 108 are retrieved. The capacity event auto scaling rules 304 provide insight into the operation of the data centers 102 if a capacity event occurs. For instance, an analysis of the capacity event auto scaling rules 304 specified by the customers of the cloud computing platform 108 might reveal that a significant number of new instances 206 will be created in response to a capacity event, that a significant number of instances 206 will operate at a higher utilization during a capacity event, and other information relevant to computing the probability of data center availability during a capacity event.

From operation 706, the routine 700 proceeds to operation 708, where data is generated and/or retrieved describing the historical reaction to previous capacity events by customers of the cloud computing platform 108 that utilize a third-party auto scaling mechanism or that auto scale their instances 206 manually. This information may provide insight into the behavior of these customers in response to a future capacity event and the additional demand that will be placed upon the data centers 102 if a capacity event occurs.

From operation 708, the routine 700 proceeds to operation 710, where the number of reserved instances purchased by the customers of the cloud computing platform 108 is determined. A high number of reserved instances may indicate a lower probability that capacity will be available to a customer that has not purchased reserved instances. Conversely, a low number of reserved instances may indicate a higher probability that data center capacity will be available during a capacity event.

The number of reserved instances purchased by the customer for which the probability determination is being made might also be identified. If the customer has purchased reserved instances for their entire fleet, the probability that data center capacity will be available for this customer may be at or near 100%. If the customer has purchased no reserved instances, or has only purchased reserved instances for a small portion of their fleet, the probability that data center capacity will be available may be significantly lower than 100% depending upon other factors.

From operation 710, the routine 700 proceeds to operation 712 where the probability that desired data center capacity will be available for a customer following a capacity event is computed. As discussed above, some or all of the factors described above with regard to operations 702-710 may be utilized. Other factors not described herein might also be utilized. Additionally, the factors might also be weighted variously to emphasize or de-emphasize the relevance of the various factors. Once the probability has been computed, the routine 700 proceeds to operation 714, where it returns to operation 604 of the routine 600 described above.

It should be appreciated that the probability discussed above might also be computed with regard to particular availability zones or groups of availability zones. For instance, the probability that capacity will be available in a particular availability zone following the failure of another availability zone might be computed. Similarly, the probability that capacity will be available from a group of availability zones following the failure of one or more other availability zones might also be calculated. The calculated percentages might be utilized in the manner described above.

It should also be appreciated that, in other embodiments, a probability is computed that server computers hosting instances in different availability zones will fail concurrently. This calculation takes into account the reality that, in practice, server computers in two different availability zones might fail concurrently. Additionally, the probability that individual server computers within the same availability zone might also be computed. For instance, the probability may be computed that server computers within two different racks within the same data center may be calculated. Action may be taken based upon the results of these calculations, such as placing instances in server computers in the same or different availability zones that have the smallest chance of concurrent failure.

Figure 8A:
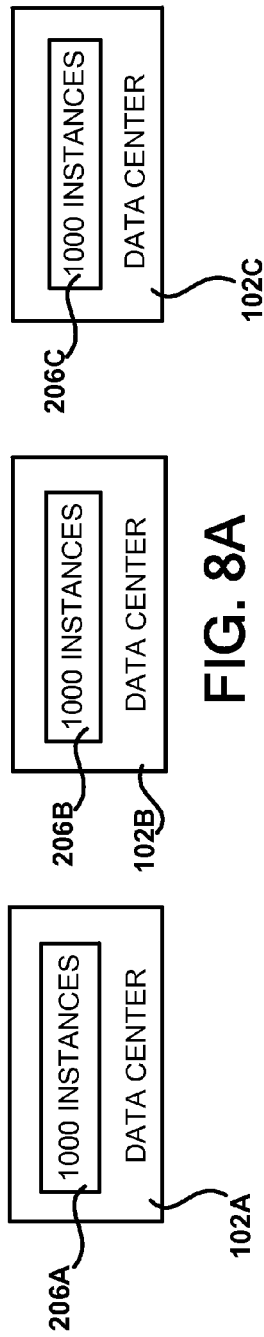
FIGS. 8A-8C are computing system diagrams illustrating additional aspects of a mechanism disclosed herein for adjusting auto scaling rules based upon a probability that data center capacity will be available at the time of a capacity event within an illustrative data center configuration.
Figure 8B:
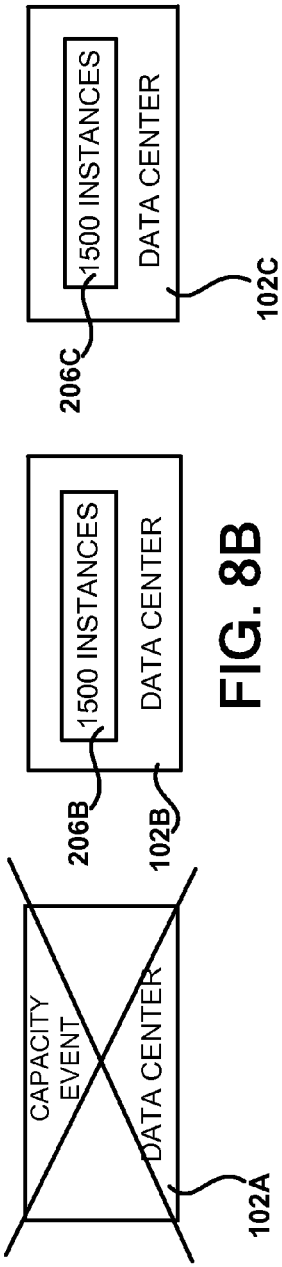
Figure 8C:
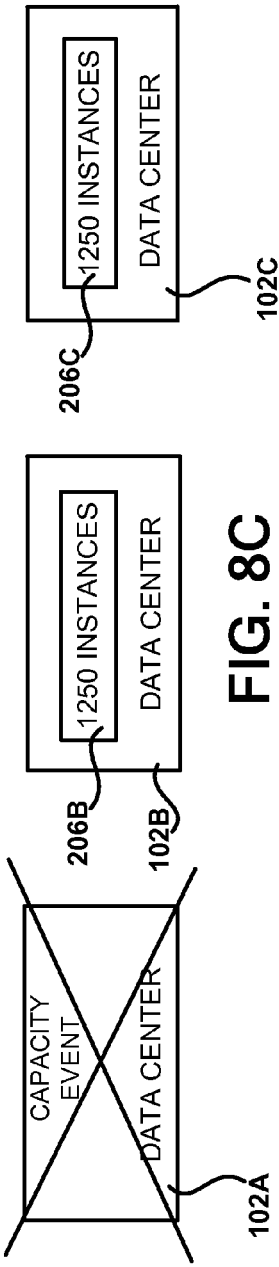

FIGS. 8A-8C are computing system diagrams illustrating additional aspects of a mechanism disclosed herein for adjusting auto scaling behavior based upon a probability that data center capacity will be available at the time of a capacity event within an illustrative data center configuration. In the example configuration shown in FIG. 8A, 1000 instances 206 are being operated in each of three data centers 102A-102C (3000 total instances).

In the absence of any other information regarding the data centers 102A-102C, an assumption may be made that the total load served by the data centers 102A-102C will remain constant following a capacity event. In this example, such an assumption implies that 1000 new instances 206 will be instantiated at the data centers 102B and 102C (500 new instances each) in response to a large-scale capacity event at the data center 102A, for instance (as shown in FIG. 8B). These new instances might be instantiated by the auto scaling component 212, a third-party auto scaling component, or manually.

If each of the data centers 102B and 102C has a maximum capacity of 1300 instances, then certain customers (i.e. those that have not purchased reserved instances) may be unable to obtain desired capacity during a capacity event. However, utilizing the mechanism described above with respect to FIGS. 6-7, it may be calculated that the actual number of instances that will be instantiated at the data centers 102B and 102C will be 500 instead of 1000 (as shown in FIG. 8C). For instance, using the factors described above it may be determined that a significant number of instances 206 utilize the capacity event auto scaling rules 304 described above to increase average utilization during a capacity event. This, in turn, will reduce the number of new instances launched at the data centers 102B and 102C. Consequently, the data centers 102B and 102C will be able to handle the redirected load in the event of a capacity event at the data center 102A. As discussed above, the results of such a probability analysis may be utilized to modify the capacity event auto scaling rules 304 or the standard auto scaling rules 302 for a customer. Other actions might also be taken, such as purchasing reserved instances on behalf of the customer.

It should be appreciated that, in another scenario, a customer might specify auto scaling rules that increase the number of instances utilized following a capacity event. For example, if a customer needs 2000 instances to support their application, they might configure three data centers to host 1000 instances each in the manner shown in FIG. 8A. This configuration allows one data center to fail completely while still guaranteeing acceptable application performance. To account for the possible failure of a second data center, however, the customer might specify auto scaling rules that cause an additional 1000 instances to be launched in each of the surviving data centers. In this manner, each of the two surviving data centers will host 2000 instances. If one of the two surviving data centers fails, then a single data center hosting 2000 instances will be present and the application can continue executing in a performant manner.

Figure 9:
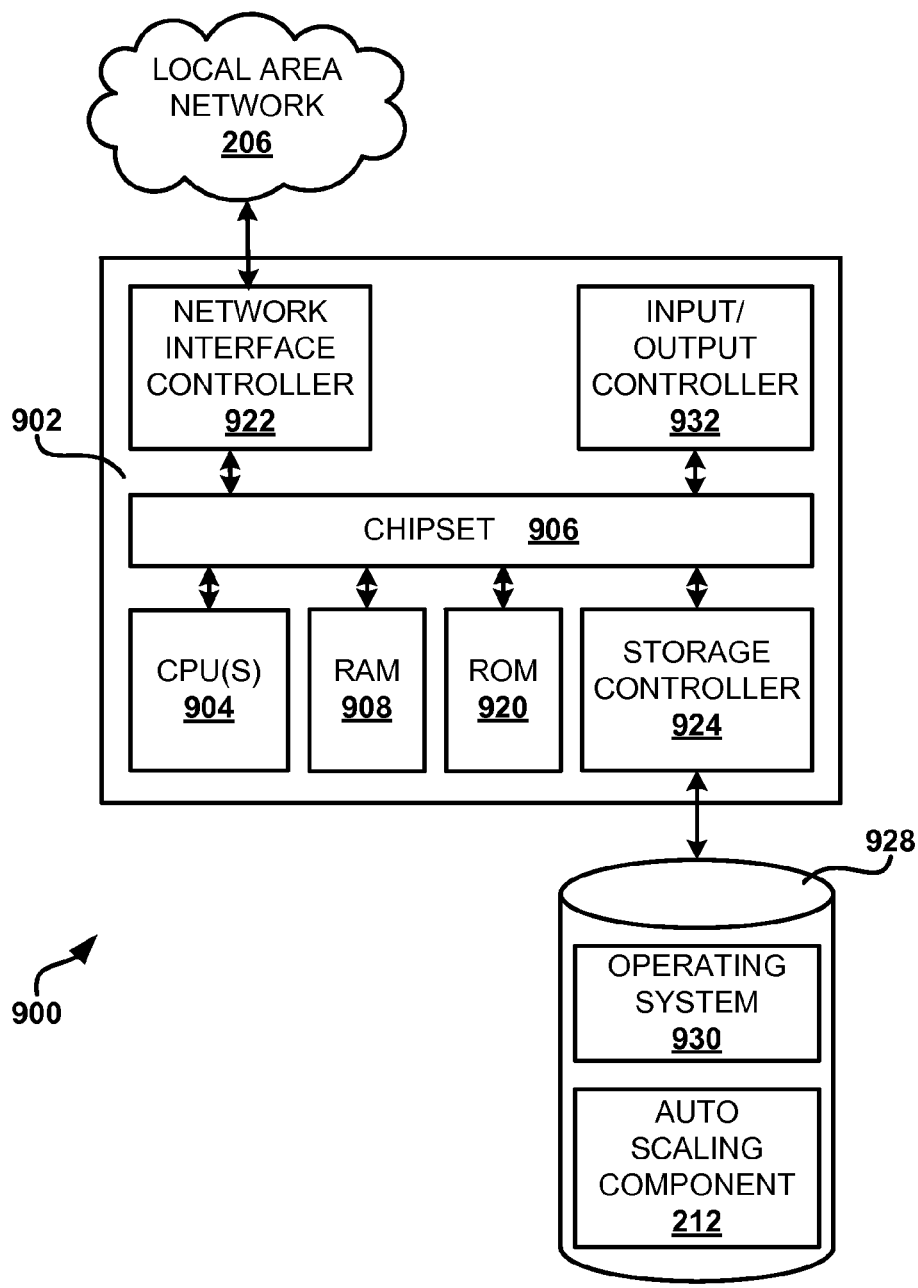
FIG. 9 is a computer architecture diagram showing an illustrative computer hardware architecture for implementing the various computing devices described in embodiments presented herein.

FIG. 9 shows an example computer architecture for a computer 900 capable of executing the software components described above. The computer architecture shown in FIG. 9 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 are standard programmable processors that perform arithmetic and logical operations necessary for the operation of the computer 900.

The CPUs 904 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard. The chipset 906 may provide an interface to a random access memory ("RAM") 908, used as the main memory in the computer 900. The chipset 906 may further provide an interface to a computer-readable storage medium such as a read-only memory ("ROM") 920 or non-volatile RAM ("NVRAM") for storing basic routines that that help to startup the computer 900 and to transfer information between the various components and devices. The ROM 920 or NVRAM may also store other software components necessary for the operation of the computer 900 in accordance with the embodiments described herein.

The computer 900 may operate in a networked environment using logical connections to remote computing devices and computer systems through the network 206. The chipset 906 may include functionality for providing network connectivity through a network interface controller ("NIC") 922, such as a gigabit Ethernet adapter. The NIC 922 is capable of connecting the computer 900 to other computing devices over the network 206. It should be appreciated that multiple NICs 922 may be present in the computer 900, connecting the computer to other types of networks and remote computer systems.

The computer 900 may be connected to a mass storage device 928 that provides non-volatile storage for the computer. The mass storage device 928 may store system programs, application programs, other program modules, and data, which have been described in greater detail herein. The mass storage device 928 may be connected to the computer 900 through a storage controller 924 connected to the chipset 906. The mass storage device 928 may consist of one or more physical storage units. The storage controller 924 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 928 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 928 is characterized as primary or secondary storage, and the like.

For example, the computer 900 may store information to the mass storage device 928 by issuing instructions through the storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 928 by detecting the physical states or characteristics of one or more particular locations within the physical storage units.

In addition to the mass storage device 928 described above, the computer 900 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 928 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 928 may store other system or application programs and data utilized by the computer 900, such as the instances 206A-206N, the instance manager 208, and the management component 204, each of which was described above.

In one embodiment, the mass storage device 928 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the routines 400, 600, and 700, described with regard to FIGS. 4, 6, and 7, respectively.

The computer 900 may also include an input/output controller 932 for receiving and processing input from a number of input devices, such as a keyboard, a mouse, a touchpad, a touch screen, an electronic stylus, or other type of input device. Similarly, the input/output controller 932 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for adjusting auto scaling behavior during a capacity event have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon which, when executed by a computer, cause the computer to:
    scale, according to a first set of rules, virtual machine instances associated with a customer of a computing platform that comprises a plurality of availability zones for providing the virtual machine instances, wherein the first set of rules are defined by the customer and comprise rules for a particular action to be taken when one or more conditions occur and wherein the particular action comprises instantiating new virtual machine instances or terminating existing virtual machine instances;
    compute a probability that a capacity of the plurality of the availability zones for providing virtual machine instances will be available during a capacity event, the capacity event reducing the capacity of the availability zones by causing one or more of the virtual machine instances associated with the customer to become unavailable;
    modify the first set of rules based upon the computed probability to generate one or more modified rules;
    cause the virtual machine instances to be scaled utilizing the modified rules in the absence of the capacity event;
    receive a notification that the capacity event has occurred in the computing platform;
    in response to receiving the notification, scale the virtual machine instances associated with the customer during the capacity event according to a second set of rules defined by the customer;
    determine that the capacity of the plurality of availability zones has been restored following the capacity event; and
    in response to determining that the capacity of the plurality of availability zones has been restored, scale the virtual machine instances associated with the customer according to the first set of rules.

2. The computer-readable storage medium of claim 1, wherein the second set of rules comprise one or more scale up rules that specify one or more actions for instantiating new virtual machine instances when one or more conditions occur.

3. The computer-readable storage medium of claim 2, wherein the second set of rules further comprise one or more scale down rules that specify one or more actions for terminating the virtual machine instances associated with the customer when one or more conditions occur.

4. The computer-readable storage medium of claim 2, wherein the scale up rules further specify a particular availability zone in which new virtual machine instances should be instantiated during a capacity event.

5. The computer-readable storage medium of claim 2, wherein the one or more conditions comprise one or more conditions of the virtual machine instances.

6. The computer-readable storage medium of claim 1, wherein the probability is computed, at least in part, based upon historical data regarding the availability of instances of computing resources following a capacity event.

7. An apparatus comprising:
    a processor; and
    a computer-readable storage medium having computer-executable instructions stored thereon which, when executed by the processor, cause the computer to:
    cause virtual machine instances associated with a customer of a computing platform that provides the virtual machine instances to be scaled according to a first set of rules specified by the customer, wherein the first set of rules comprise rules for a particular action to be taken when one or more conditions occur and wherein the particular action comprises instantiating new virtual machine instances or terminating existing virtual machine instances,
    compute a probability that a capacity of data centers associated with the computing platform for providing virtual machine instances will be available during a capacity event, wherein the capacity event reduces the capacity of the data centers by causing one or more of the virtual machine instances to become unavailable,
    modify the first set of rules based upon the computed probability to generate one or more modified rules,
    cause the virtual machine instances to be scaled utilizing the modified rules in the absence of a capacity event,
    receive a notification that the capacity event has occurred in the computing platform,
    in response to receiving the notification, cause the virtual machine instances associated with the customer to be scaled during the capacity event according to a second set of rules defined by the customer;
    determine that the capacity of the data centers has been restored following the capacity event; and
    in response to determining that the capacity of the data centers has been restored, cause the virtual machine instances associated with the customer to be scaled according to the first set of rules.

8. The apparatus of claim 7, wherein the probability is computed, at least in part, based upon historical data regarding the availability of virtual machine instances following a capacity event.

9. The apparatus of claim 7, wherein the probability is computed, at least in part, based upon a maximum capacity and a current capacity of one or more data centers providing the virtual machine instances.

10. The apparatus of claim 7, wherein the probability is computed, at least in part, based upon auto scaling rules specified by a plurality of customers.

11. The apparatus of claim 7, wherein the probability is computed, at least in part, based upon historical data regarding the reaction of one or more customers to a previous capacity event.

12. The apparatus of claim 7, wherein the probability is computed, at least in part, based upon a number of reserved virtual machine instances purchased by one or more customers.

13. The apparatus of claim 7, wherein the computer-readable storage medium comprises further computer-readable instructions which, when executed by the processor, will cause the computer to reserve one or more virtual machine instances based upon the computed probability.

14. A computer-implemented method for capacity availability aware auto scaling, the method comprising:
    scaling, according to a first set of rules, instances of computing resources associated with a customer of a computing platform that provides the instances of computing resources, wherein the first set of rules is defined by the customer and comprise rules for a particular action to be taken when one or more conditions occur, and wherein the particular action comprises instantiating new instances of computing resources or terminating existing instances of computing resources;
    computing a probability that data center capacity associated with the computing platform for providing instances of computing resources will be available during a capacity event, the capacity event reducing the data center capacity by causing one or more of the instances of computing resources to become unavailable;
    modifying the first set of rules based upon the computed probability to generate one or more modified rules;
    causing the instances of computing resources to be scaled utilizing the modified rules in the absence of a capacity event;
    receiving a notification that the capacity event has occurred in the computing platform;
    in response to receiving the notification, scaling the instances of computing resources associated with the customer during the capacity event according to a second set of rules defined by the customer;
    determining that the data center capacity has been restored following the capacity event; and
    in response to determining that the data center capacity has been restored, scaling the instances of computing resources associated with the customer according to the first set of rules.

15. The computer-implemented method of claim 14, wherein the probability is computed, at least in part, based upon historical data regarding the availability of instances of computing resources following a capacity event.

16. The computer-implemented method of claim 14, wherein the probability is computed, at least in part, based upon a maximum capacity and a current capacity of one or more data centers associated with the computing platform for providing the instances of computing resources.

17. The computer-implemented method of claim 14, wherein the probability is computed, at least in part, based upon auto scaling rules specified by a plurality of customers.

18. The computer-implemented method of claim 17, wherein the probability is further computed, at least in part, based upon historical data regarding the reaction of the plurality of customers to a previous capacity event.

19. The computer-implemented method of claim 17, wherein the probability is further computed, at least in part, based upon a number of reserved virtual machine instances purchased by the plurality of customers.

20. The computer-implemented method of claim 14, further comprising reserving one or more instances of computing resources based upon the computed probability in the absence of capacity event.

21. A system for capacity availability aware auto scaling, the system comprising:
one or more computing devices implementing a plurality of availability zones, at least one of the plurality of availability zones being configured to
scale instances of computing resources associated with a customer in the corresponding availability zone according to a first set of rules specified by the customer, wherein the first set of rules comprise rules for a particular action to be taken when one or more conditions occur and wherein the particular action comprises instantiating new instances of computing resources or terminating existing instances of computing resources,
compute a probability that a capacity will be available in the plurality of availability zones for providing the instances of computing resources during a capacity event, the capacity event reducing the capacity of the plurality of availability zones for providing the instances of computing resources by causing one or more of the instances of computing resources to become unavailable,
modify the first set of rules based upon the computed probability to generate one or more modified rules,
cause the instances of computing resources to be scaled utilizing the modified rules in the absence of the capacity event,
receive a notification that the capacity event has occurred in one of the plurality of availability zones,
scale the instances of computing resources associated with the customer during the capacity event according to a second set of rules specified by the customer,
determine that the capacity of the plurality of availability zones has been restored following the capacity event; and
in response to determining that the capacity of the plurality of availability zones has been restored, scale the instances of computing resources associated with the customer according to the first set of rules.

22. The system of claim 21, wherein the instances of computing resources comprise virtual machine instances.

23. The system of claim 21, wherein the at least one availability zone is further configured to cause one or more instances of computing resources to be reserved based upon the computed probability.

24. The system of claim 21, wherein the probability is computed, at least in part, based upon historical data regarding the availability of instances of computing resources following a capacity event.

25. A computer-implemented method for capacity availability aware auto scaling, the method comprising:
scaling, according to a first set of rules, instances of computing resources associated with a customer of a computing platform that comprises a plurality of availability zones for providing the instances of computing resources, wherein the first set of rules are defined by the customer and comprise rules for a particular action to be taken when one or more conditions occur and wherein the particular action comprises instantiating new instances of computing resources or terminating existing instances of computing resources;
computing a probability that a capacity of the plurality of availability zones for providing instances of computing resources will be available during a capacity event, the capacity event reducing the capacity of the availability zones by causing one or more of the instances of computing resources to become unavailable;
modifying the first set of rules based upon the computed probability to generate one or more modified rules;
causing the instances of computing resources to be scaled utilizing the modified rules in the absence of the capacity event;
receiving a notification that the capacity event has occurred in the computing platform;
in response to receiving the notification, scale the instances of computing resources associated with the customer during the capacity event according to a second set of rules defined by the customer;
determining that the capacity of the plurality of availability zones has been restored following the capacity event; and
in response to determining that the capacity of the plurality of availability zones has been restored, scaling the instances of computing resources associated with the customer according to the first set of rules.

26. The computer-implemented method of claim 25, wherein the second set of rules comprise one or more scale up rules or scale down rules for use during the capacity event.

27. The computer-implemented method of claim 25, wherein the instances of computing resources comprise virtual machine instances.

28. The computer-implemented method of claim 25, wherein the probability is computed, at least in part, based upon historical data regarding the availability of instances of computing resources following a capacity event.

29. The computer-implemented method of claim 25, wherein the probability is computed, at least in part, based upon a maximum capacity and a current capacity of the plurality of availability zones for providing the instances of computing resources.

30. The computer-implemented method of claim 25, wherein the probability is further computed, at least in part, based upon a number of reserved virtual machine instances purchased by a plurality of customers.

31. The computer-implemented method of claim 25, further comprising reserving one or more instances of computing resources based upon the computed probability in the absence of capacity event.

* * * * *